Aug. 6, 1929.  A. E. PAYSON ET AL  1,723,070
DISPENSING DEVICE
Filed April 6, 1928    2 Sheets-Sheet 2
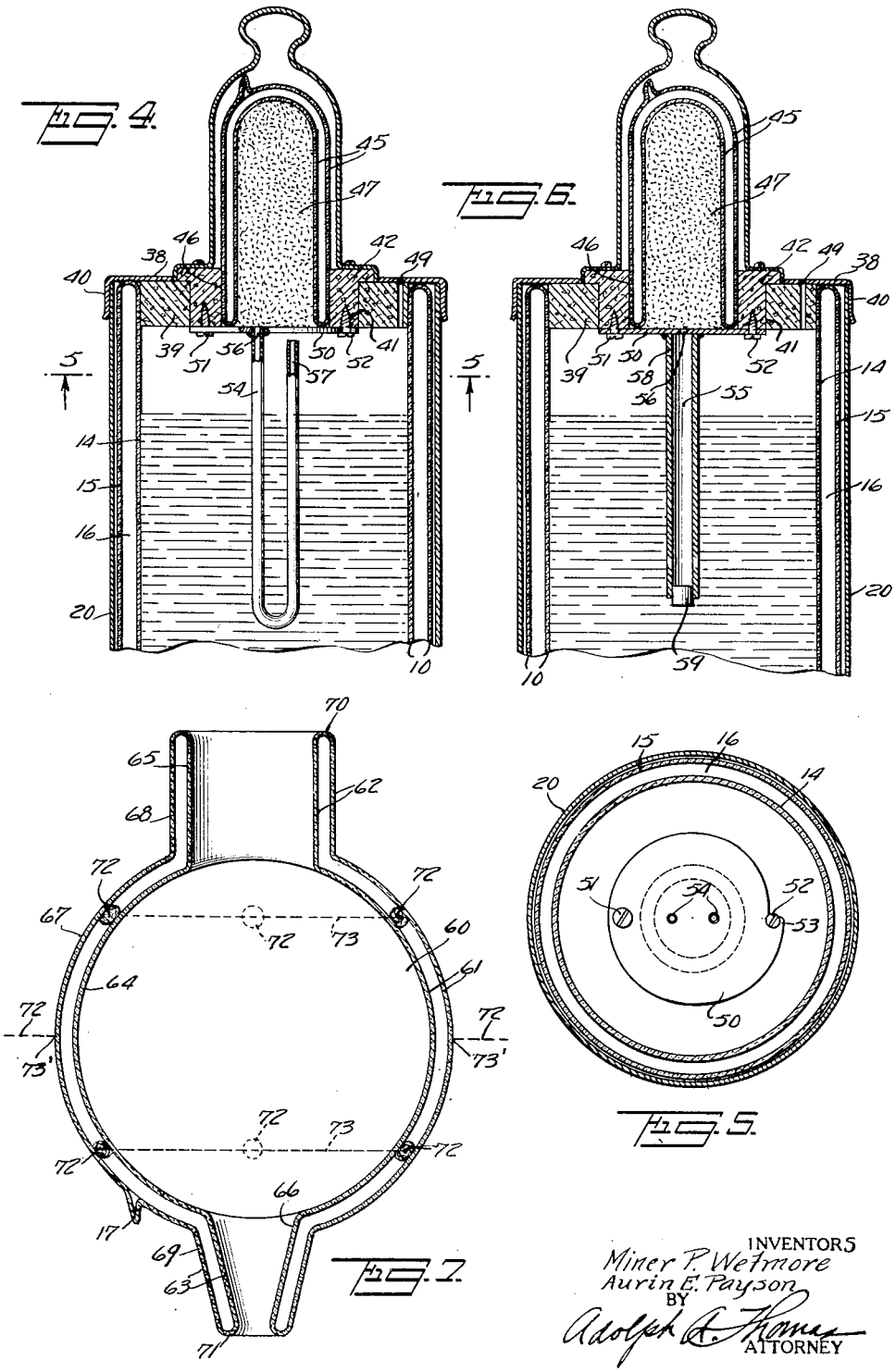
INVENTORS
Miner P. Wetmore
Aurin E. Payson
BY
Adolph A. Thomas
ATTORNEY Patented Aug. 6, 1929.

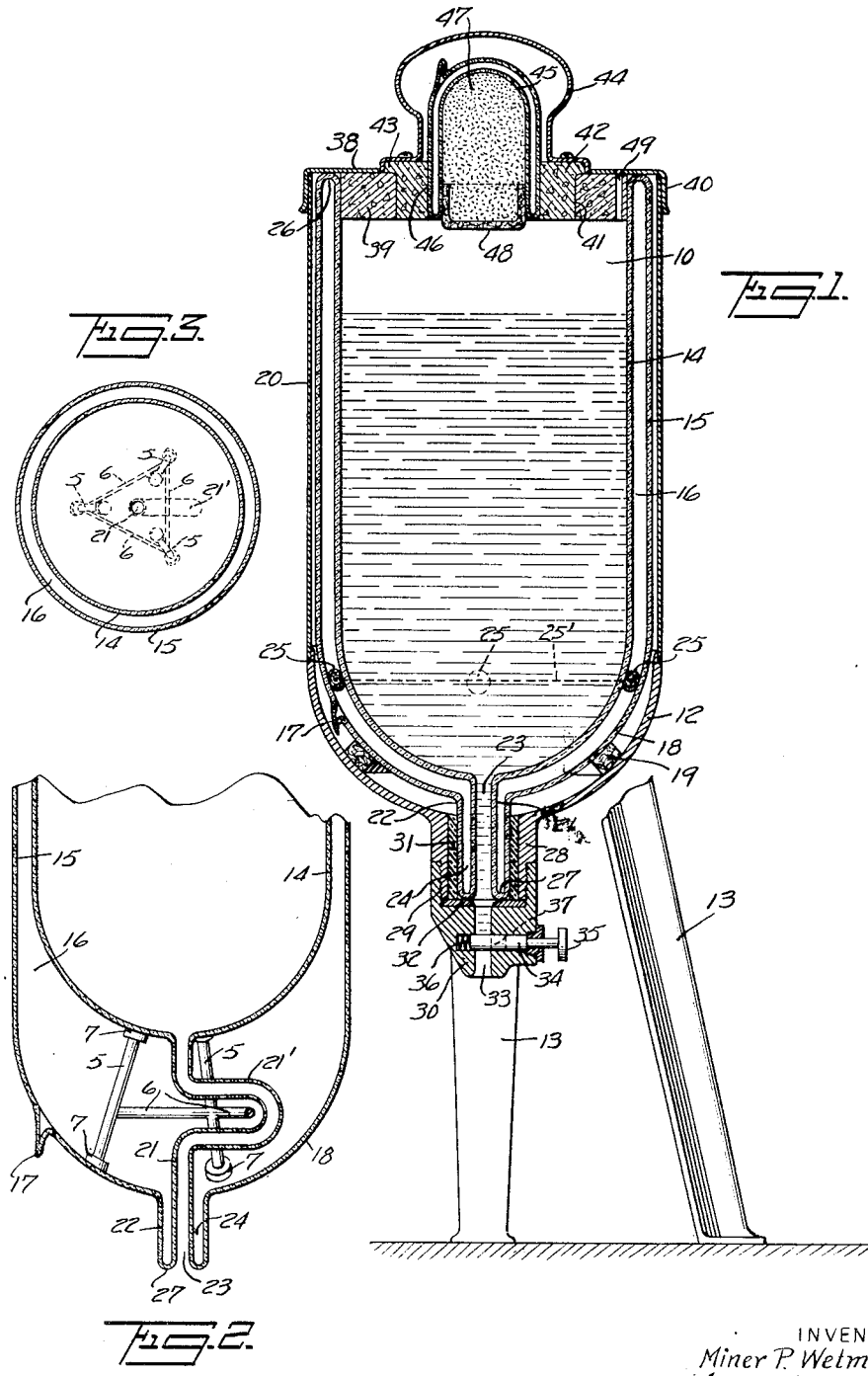

1,723,070

UNITED STATES PATENT OFFICE.

AURIN E. PAYSON AND MINER P. WETMORE, OF NORWICH, CONNECTICUT.

DISPENSING DEVICE.

Application filed April 6, 1928. Serial No. 268,013.

Our invention is for a receptacle of novel construction particularly adapted for cooling and dispensing beverages. One feature of our new apparatus comprises a double-walled vacuum jar (preferably of glass) having a double-walled pipe through which the contents pass out. This pipe consists of a pair of tubes attached, respectively, to the inner and outer walls of the jar. When the two containers or cylinders of the jar are assembled, the two tubes are in concentric spaced relation and are sealed at their outer ends. In this way the double-walled pipe forms a tubular continuation of the annular vacuum chamber between the walls of the jar. In a preferred form of our invention, the inner tube has a lateral bend to take up movements of the glass walls under changes of temperature.

Another feature of our dispensing receptacle is a refrigerating stopper having a cooling tube extending into the liquid of the container. The stopper has a chamber for solidified carbon dioxide (known in the trade as dry ice), and the bottom of the chamber is closed by a movable cover to which one end of the cooling tube is attached. As the dry ice vaporizes, it passes through the tube into the container, thereby cooling the tube and the space above the liquid. The tube is of good heat-conducting material and its cold temperature is directly imparted to the liquid into which it dips.

In order to explain our invention so that its various features and advantages may be fully understood, we have selected several embodiments for illustration and description. In the accompanying drawings—

Fig. 1 shows a cross-sectional view of a water cooler (or dispenser of other cold beverages) constructed in accordance with our invention;

Fig. 2 is a cross-sectional fragmentary view of a modified form of dispensing jar;

Fig. 3 is a plan of Fig. 2;

Fig. 4 shows a dispenser (partly broken away) provided with a refrigerating stopper carrying a U-shaped tube that dips into the liquid, this view being mainly a vertical cross-section;

Fig. 5 is a transverse section on line 5—5 of Fig. 4 looking in the direction of the arrows;

Fig. 6 illustrates a view similar to Fig. 4, with a straight tube projecting from the stopper into the liquid; and Fig. 7 represents a vertical cross-section of a double-walled dispensing jar with a spherical body.

Referring first to Fig. 1, a heat-insulated jar or receptacle 10 is mounted on a suitable base 12 supported on legs 13, only two of which are shown for lack of space. For convenience, we shall refer to the receptacle 10 as a jar without thereby intending any limitation, but including any practical form, design and size of receptacle or container adapted to hold liquids. The jar 10 is preferably of glass and of the double-walled vacuum type comprising an inner wall 14 and an outer wall 15 separated by an annular chamber 16, which is evacuated through a tip 17 at the bottom of the jar in a manner well understood by those familiar with glassware of that kind. Jars of large size (say, of 5-gallon capacity or more) are preferably made of pyrex glass, so that they can be more safely handled and used. The base 12 is a hollow spherical casting adapted to receive the spherical bottom 18 of the jar, which may rest on a ring 19 of cork or other shock-absorbing material. The ring 19 is shaped to fit the hollow spherical base 12 and is sufficiently thick to hold the tip 17 safely out of contact with the base. An outer casing or jacket 20, conveniently made of sheet metal, is secured at its lower end to the base 12 (as by screws or rivets) and completely encloses the glass jar 10 to hold the same in upright position and protect it against injury. It is evident that the base 12 may project upwardly a sufficient distance to engage the outer wall of the jar and hold it firmly in upright position without the need of jacket 20. When it is desired to expose the contents of the jar to view, the jacket 20 is either dispensed with entirely, or constructed like a grille.

From the base of jar 10 extends a double-walled pipe consisting of an inner tube 21 attached to the inner wall 14 and an outer tube 22 attached to the outer wall 15. When the jar is of glass, as it usually will be, the tubes 21 and 22 are fused at their inner ends to the walls of the jar, so that the double-walled pipe thus formed is an integral tubular extension of the body of the jar. The concentric tubes 21 and 22 are fused together at their outer ends to make an airtight seal, and the passage 23 formed by the inner tube 21 is open to the interior of the jar. In other words, the double-walled pipe 21—22 forms an outlet for the jar. The annular space 24 between the tubes 21 and 22 is a continuation of the annular chamber 16 between the walls of the jar, so that the inner tube 21 through which the liquid flows is heat-insulated by a vacuum from the outer tube 22 (except at the sealed tip).

In the practical construction of the double-walled glass jar 10, the outer and inner walls are formed separately in molds, but without the tubular extensions 21 and 22. The glass tubes 21 and 22 are then fused to the rounded bottoms of the inner and outer containers 14 and 15. In assembling the jar, the inner container is inserted into the outer container, with the inner tube 21 passing into the outer tube 22. Spacing pads 25 of asbestos or other non-conducting material hold the two containers in concentric relation. These pads are usually connected by a wire ring 25' to hold them in place. The assembled containers 14 and 15 are sealed at the neck 26 by fusion of the glass, and the outer ends of the tubes 21 and 22 are sealed at 27 in the same way. Or, the outer tube may be fused to the outer container 15 after the latter has been positioned over the inner container, and the two containers fixed at the neck 26 and at the discharge end 27. It is immaterial which of the sealed joints 26 and 27 is made first. The jar 16 being thus completed, the vacuum chamber 16 and its tubular continuation 24 are connected to a vacuum pump through the tip 17.

The base 10 is provided with a hollow cylindrical extension 28 having a screw-threaded end 29 to which a casting 30 is connected. The cylindrical extension 29 has a non-metallic lining 31, which is preferably in the form of a rubber tube for receiving the double-walled pipe 21—22 in a tight frictional fit. The casting 30 has a rubber gasket 32 on which the end of the double-walled pipe rests, so as to make a leak-proof joint. The casting has an opening 33 communicating with the outlet passage 23 of the jar. A suitable faucet or valve member 34 normally closes the discharge opening 33. In the present instance, merely by way of illustration, we have shown the valve member 34 as a plunger operated by a push-button 35 and normally held in closing position by a coil spring 36. The plunger 34 has a hole 37 which comes in line with the openings 23 and 33 when the button 35 is pushed in. Any other practical means may be used for controlling the flow of liquid from the jar 10.

In the modified form of glass jar as shown in Figs. 2 and 3, the inner tube 21 has a lateral U-shaped bend 21' which automatically accommodates itself to movements of the tube and the inner container 14 due to expansion and contraction of the glass under changes of temperature. The lateral bend 21' acts like a spring and prevents breakage of the tube. Actual tests have shown that the U-shaped bend 21' will give as much as one-eighth inch movement without breaking. This construction is particularly advantageous in jars of large capacity. To make room for the lateral bend 21' of tube 21, the rounded base of the inner container 14 in Fig. 2 requires considerable spacing from the bottom 18 of the outer container 15. Ordinary spacing pads like 25 in Fig. 1 will not do, and we therefore provide a tripod arrangement comprising three brass tubes 5 rigidly connected by rods 6 and carrying at their ends heat-insulating pads 7, which may be pieces of asbestos, cork, and the like. The rods 5 act like braces between the rounded bottoms of the containers 14 and 15, so that the annular chamber 16 may be exhausted without danger of breaking or pulling down the base of the inner container. The spacing of rods 5 is such that the tripod is easily inserted in place without hindrance by the lateral bend 21'. In assembling the jar, the inner container is supported in inverted position, the bent tube 21 is fused in place, the tripod 5 is then placed on the base of the inverted container, then the outer container 15 with tube 22 is inserted over the inner container, whereupon the jar is sealed at the neck and at the discharge end of tubes 21—22. Otherwise what has been said about Fig. 1 applies to the jar of Figs. 2 and 3.

The liquid contents of jar 10 are cooled by a refrigerating unit mounted in the lid or cover of the jar. The mouth of the jar is closed by a cap 38 which carries a stopper 39 arranged to fit tight into the jar. The cap 38 is preferably of sheet metal and the disk 39 is of cork or like material. These two parts are rigidly connected in any practical way, as by cement, screws, rivets and the like. The sheet metal cap 38 has a cylindrical flange 40 arranged to fit over the jacket 20. The disk 39 has an opening 41 for receiving a stopper 42 of cork or similar material. The stopper 42 has an annular flange or shoulder 43 adapted to rest on the upper edge of disk 39. A hollow knob or grip 44, easily made of sheet metal, is secured to the flange 43 of stopper 42. A heat-insulated container 45, which is here shown as a small double-walled bottle of glass, is frictionally held in an opening 46 of stopper 42 and contains a refrigerant 47, such as solidified carbon dioxide, commonly called dry ice. The mouth of the double-walled container 45 is closed by a stopper 48, which is pervious to the gradual escape of carbon dioxide gas into the interior of jar 10. The stopper 48 may be molded pulp, perforated cork, or any other suitable material. The hollow knob 44 receives the projecting base portion of the container 45 and protects it against injury.

As the solidified carbon dioxide 47 in container 45 evaporates on account of the higher temperature in the jar, the gas escapes slowly through the perforated or pervious stopper 48, and in expanding it cools the upper layer of the liquid in the jar. The cooled liquid gravitates toward the bottom of the jar and thereby sets up a circulation by which the entire liquid mass is cooled. To prevent undue gaseous pressure in jar 10, we provide a small vent 49 in cap 38 and disk 39. Carbon dioxide gas is a safe refrigerant to use, and even if the liquid contents of the jar should become slightly charged with the gas, it would not be objectionable. In fact, many people prefer carbonated beverages.

To facilitate or expedite the cooling of the liquid in the jar, we employ a cooling tube that dips into the liquids. Figs. 4 and 6 show two examples of such a construction. The stopper in these modifications differs from the stopper of Fig. 1 in that the porous cup 48 is replaced by a metal disk or cover plate 50 pivoted to the underside of stopper 42 by a screw 51. A second screw 52 carried by the stopper is arranged to engage the hook-shaped or slotted projection 53 of disk 50 to hold the latter firmly in closed position. In Fig. 4, the cover plate 50 carries a U-shaped tube 54, while in Fig. 6 a straight tube 55 is attached to the pivoted cover. The parts 50 and 55 are preferably made of aluminum or plated copper, but any other practical material will do. The tubes are mounted on the cover in any practical way, as by solder, screwthreads, etc. In each instance, the tube is open to the refrigerating chamber 45 through a hole 56 in disk 50, so that carbon dioxide vapor enters the tube amid expansion and consequent cooling. The U-shaped tube 54 is open at 57, and the straight tube 55 is open at 58. The lower end of tube 55 is closed by a plug 59. The escape openings 57 and 58 terminate above the liquid, so that the same will not become charged with the gas. We have found by actual tests that the tube 54 (or 55) becomes very cold and acts like an unmeltable icicle held in the liquid, which is quickly cooled. After the contents of the jar have been withdrawn to such extent that the level of the liquid is below the tube 54 or 55, the cooling action of the tube continues in helping to keep the space above the liquid at low temperature. Of course, the main cooling action is due to the rapidly expanding gas as it issues out of the tube into the jar, but the tube 54 (or 55) hastens the cooling of the liquid contents after the jar is filled. Like parts in Figs. 1, 4 and 6 are indicated by the same reference numerals, so that, to prevent unnecessary repetition, the detailed description of Fig. 1 may be considered as applying to Figs. 4 and 6 with regard to similarly numbered parts.

Fig. 7 illustrates another embodiment of our new receptacle. Here we have a double-walled vacuum jar 60 comprising a substantially spherical or globe-shaped body 61, a cylindrical neck 62, and a tapering or conical discharge pipe 63. The inner wall 64 is formed at one end with a cylindrical extension 65, and at the other end with a conical extension 66. The outer wall 67 has a cylindrical extension 68 on top and a tapering extension 69 at the bottom. The cylindrical extensions 65 and 68 are sealed at 70 and form the double-walled neck 62. The conical extensions 66 and 69 are sealed at 71, and form the double-walled conical pipe or tube 63 through which the contents of the jar pass out. No mounting for the jar 60 is shown, but it is evident that it can be supported in a manner similar to jar 10 in Fig. 1, with obvious changes in the shape of certain parts. The spherical walls of jar 60 as spaced by two sets of pads 72, which are usually of asbestos and held together by a wire 73.

An easy way to assemble the parts of jar 60 is this: The inner and outer walls 64 and 67 are blown separately in suitable molds, with the integral extensions 65—66 and 68—69, respectively. The next step is to crack the outer bulb 67 transversely across the center 72. The upper half of bulb 67 is now inserted over the top of the inner part 64, the two parts being held in spaced concentric relation by the pads 72. The neck extensions 65 and 68 are fused at 70. The final step is to place the lower half of bulb 67 over the lower half of the inner part 64, whereupon the parts are sealed at 71 and at the previously severed edge 73'. The assembled jar is now ready for exhausting through tip 17 in the usual way. If the circumferential seal 73' is not perfectly smooth, that matters not in the least. The jar 60 is preferably made of pyrex glass, or other glass capable of standing up under conditions of actual use. The spherical shape of the bottle or jar 60 gives it unusual strength.

In the basic aspect of our invention, the double-walled vacuum jar with its double-walled discharge pipe may be put to any practical use, and we have shown it as a liquid dispenser merely by way of example and not as a restriction or limitation of our invention. Although we have shown and described certain specific constructions, it should be understood that this invention is not limited to any of the details set forth unless so specified in the claims.

We claim as our invention:

1. Apparatus for dispensing liquids comprising the combination of a base, a double-walled vacuum receptacle of glass supported in upright position on said base for containing liquids, said receptacle having a double-walled tubular extension at or near the bottom to constitute a discharge pipe open to the interior of the receptacle, the space between the walls of said pipe being open to the vacuum chamber of the receptacle, means on said base for enclosing the lower portion of said discharge pipe, and valve-controlled means associated with said discharge pipe.

2. Apparatus for dispensing liquids comprising the combination of a base, a double-walled vacuum jar supported in upright position on said base for containing liquids, a double-walled outlet pipe extending downwardly from the bottom of said jar and communicating with the interior thereof, said pipe consisting of a pair of concentric tubes attached respectively to the inner and outer walls of said jar, and means carried by said base for enclosing said pipe, said means having a valve-controlled discharge opening connected with said pipe.

3. A cooling and dispensing receptacle for liquids comprising a heat-insulated jar for containing liquids, means for supporting said jar in upright position, a closure for the upper end of said jar, a refrigerating unit carried by said closure, said unit containing solidified carbon dioxide and having means permitting the gradual escape of carbon dioxide gas into the jar where the gas expands in the space above the liquid which is thereby cooled, the cooled liquid on top and the warmer liquid below setting up a circulation whereby the cooling effect of the gas is automatically distributed through the liquid mass, and means for withdrawing the liquid contents of said jar.

4. A beverage dispenser comprising a heat-insulated receptacle for containing liquids, a closure for the mouth of said receptacle, a refrigerating unit carried by said closure, said unit containing solidified carbon dioxide, a pipe connected to said unit for permitting the escape of carbon dioxide gas into the interior of the receptacle, said pipe being arranged to dip into the liquid contents of the receptacle, and means for discharging the liquid from said receptacle.

5. A beverage dispenser comprising a heat-insulated receptacle for containing liquids, a closure for the mouth of said receptacle, a refrigerating unit carried by said closure, said unit containing solidified carbon dioxide, a movable cover for said unit, a pipe connected to said cover for permitting the escape of carbon dioxide gas into the interior of the receptacle, said pipe being arranged to dip into the liquid contents of the receptacle, and means for discharging the liquid from said receptacle.

6. A beverage dispenser comprising a heat-insulated receptacle for containing liquids, a closure for the mouth of said receptacle, a refrigerating unit carried by said closure, said unit containing solidified carbon dioxide, a U-shaped pipe connected at one end to said cover and open at the other end for permitting the escape of gas through the pipe into the receptacle, a portion of said pipe dipping into the liquid contents of the receptacle while the discharge end of said pipe terminates above the liquid, and means for discharging the liquid from said receptacle.

7. Apparatus for dispensing liquids comprising a supporting frame having a hollow spherical base, a screwthreaded sleeve projecting downwardly from the center of said base, a casting screwed on said sleeve and having a valve-controlled discharge opening, said sleeve and casting forming a closed cylindrical chamber, a yieldable tubular lining for said chamber, a double-walled vacuum jar having a spherical bottom seated in said spherical base, said jar being held in upright position for containing liquids, and a double-walled outlet pipe extending from the bottom of said jar into said lined chamber, said pipe being open to the interior of the jar and consisting of a pair of concentric tubes extending from the inner and outer walls of said jar, whereby the interior of the jar communicates with said valve-controlled discharge opening through said double-walled pipe.

8. A liquid cooling and dispensing device comprising the continuation of a base, a double-walled vacuum jar supported on said base in upright position and adapted to contain liquids, a double-walled pipe extending downwardly from the bottom of said jar, said pipe consisting of a pair of concentric tubes extending from the inner and outer walls of the jar, the inner tube being open to the interior of the jar, a tubular casing on said base for receiving said double-walled pipe in a liquid-tight fit, said casing being provided with a valve-controlled discharge opening with which said pipe communicates, a closure for the upper end of said jar, and a refrigerating unit carried by said closure, said unit containing solidified carbon dioxide and having means permitting the gradual escape of carbon dioxide gas into the jar where the gas expands in the space above the liquid which is thereby cooled, the cooled liquid on top and the warmer liquid below setting up a circulation whereby the cooling effect of the gas is automatically distributed through the liquid mass.

9. A liquid cooling and dispensing device comprising the continuation of a base, a double-walled vacuum jar supported on said base in upright position and adapted to contain liquids, a double-walled pipe extending downwardly from the bottom of said jar, said pipe consisting of a pair of concentric tubes extending from the inner and outer walls of the jar, the inner tube being open to the interior of the jar, a tubular casing on said base for receiving said double-walled pipe in a liquid-tight fit, said casing being provided with a valve-controlled discharge opening with which said pipe communicates, a closure for the upper end of said jar, and a refrigerating unit carried by said closure, said unit containing solidified carbon dioxide and having a pipe through which carbon dioxide gas escapes into the jar, said pipe being arranged to dip into the liquid and having a discharge opening above the liquid.

AURIN E. PAYSON.
MINER P. WETMORE.